United States Patent [19]

Lamont

[11] Patent Number: 4,704,443

[45] Date of Patent: Nov. 3, 1987

[54] METHOD OF REDUCING ACTIVITY OF SILICONE POLYMERS

[75] Inventor: Peter Lamont, Midland, Mich.

[73] Assignee: Dow Corning Corporation, Midland, Mich.

[21] Appl. No.: 923,465

[22] Filed: Oct. 27, 1986

[51] Int. Cl.[4] .............................................. C08G 77/04
[52] U.S. Cl. ........................................ 528/18; 556/464; 556/466; 528/32; 528/37
[58] Field of Search ................... 556/464, 466; 528/18, 528/32, 37

[56] References Cited

U.S. PATENT DOCUMENTS

| | | | |
|---|---|---|---|
| 2,709,692 | 5/1955 | Gainer | 260/46.5 |
| 2,744,923 | 5/1956 | Duane | 260/448.2 |
| 3,978,104 | 8/1976 | Razzano | 556/462 |
| 4,122,247 | 10/1978 | Evans | 528/37 |
| 4,157,337 | 6/1979 | Evans | 528/20 |

*Primary Examiner*—Melvyn I. Marquis
*Attorney, Agent, or Firm*—Edward C. Elliott

[57] ABSTRACT

A method of reducing the reaction between polydiorganosiloxane gum and reinforcing silica, which causes "creeping", has been discovered. The method mixes crude polydiorganocyclosiloxane with a carbonate or bicarbonate salt of potassium or cesium, heats the mixture, then filters to remove the salt. The treated material can be further purified by stripping this filtered material to give a polydiorganocyclosiloxane having a hydroxyl content of less than 1 part per million of polydiorganocyclosiloxane.

7 Claims, No Drawings

METHOD OF REDUCING ACTIVITY OF SILICONE POLYMERS

BACKGROUND OF THE INVENTION

1. Field of the Invention

This invention relates to the polymerization of polydiorganocyclosiloxane having low activity after polymerization.

2. Background Information

U.S. Pat. No. 2,709,692, issued May 31, 1955, teaches that potassium carbonate is a useful condensation catalyst for condensing silanol on the para position in a phenyl group. It also teaches other alkali compounds and amines can be used.

U.S. Pat. No. 2,744,923, issued May 8, 1956, teaches use of an anhydrous potassium salt of a weak acid to catalyze the condensation of organosilanols. It teaches that —SiOH is condensed without effecting Si—O—Si or linkages like —Si—OR or —Si—H. It teaches that sodium carbonate or potassium hydroxide or sodium hydroxide are not suitable.

Evans teaches in U.S. Pat. No. 4,122,247, issued Oct. 24, 1978, that the water content of cyclic siloxanes can be reduced by heating to 100° C. or above with a nitrogen purge to an amount of less than 10 parts per million.

SUMMARY OF THE INVENTION

Treatment of a crude polydialkylcyclosiloxane with a carbonate salt of potassium or cesium, at elevated temperature, then polymerizing, will yield a polymer which has a lower activity than will a similar procedure done without the treatment.

DESCRIPTION OF THE INVENTION

This invention relates to a method of reducing the activity of a polydiorganosiloxane consisting essentially of (A) mixing crude polydiorganocyclosiloxane with from 0.5 to 10 percent by weight of a carbonate or bicarbonate salt of potassium or cesium, (B) heating the mixture to a temperature of from 70° C. to 150° C. for a period of from 1 to 5 hours, with a dry gas purge to carry off volatile materials, (C) cooling to room temperature and filtering to remove the salt, to yield polydiorganocyclosiloxane having a reduced activity.

Commercial polydiorganocyclosiloxanes contain trace amounts of hydroxyl endblocked polydiorganosiloxanes. These trace amounts of impurity can act as endblockers during the polymerization of the cyclic material. This makes it difficult to control the degree of polymerization obtained since the amount of impurity is not a constant amount. The polymer obtained is also endblocked with hydroxyl groups. In many cases. for example in the case of polydimethylsiloxane fluids, the endblocking is intended to be a trimethylsiloxy group, resulting in a fluid which is very inert. If hydroxyl endblocking groups are present, the fluid may not react in the desired manner. In the case of high molecular weight polymers such as are used in producing silicone elastomers, the presence of hydroxyl groups on the polymers causes interaction with the colloidal silica used as a reinforcement. This causes the composition to form gels and crosslinks which in turn cause the condition known as crepe in the composition. A creped rubber stock is very difficult to further work with. This invention is a means of producing high molecular weight polydiorganosiloxane having a very low level of hydroxyl groups present.

The level of hydroxyl groups present can be measured by an activity test. The test is described below in Example 1. The higher the activity number, the more hydroxyl groups are present in the material being tested.

The method of this invention condenses the low molecular weight, hydroxyl endblocked polydiorganosiloxane impurities together to form high molecular weight species, without opening up the rings in the polydiorganocyclosiloxane. The polydiorganocyclosiloxane can then be stripped overhead in a reactor, leaving the high molecular weight, hydroxyl endblocked impurities behind, due to their high boiling point.

The method first mixes the crude polydiorganocyclosiloxane with from 0.5 to 10 percent by weight of a carbonate or bicarbonate salt of potassium or cesium. Salts of lithium and sodium were evaluated, but were found unsuitable for this process, which requires the condensation of the low molecular weight linears, but no effect upon the polydiorganocyclosiloxanes. The polydiorganocyclosiloxanes are normally from 3 to 5 units, with the diorganotetracyclosiloxane the preferred species. The preferred condensation catalyst is potassium carbonate. The preferred amount is from 0.5 to 2.0 percent by weight based upon the weight of the polydiorganocyclosiloxane.

In order for the condensation reaction to take place in a reasonable length of time, the mixture is heated to a temperature of from 70° C. to 150° C. The higher the temperature, the less time is required. The amount of catalyst used can also be reduced as the temperature is raised. The time of reaction is from 1 to 5 hours, with the necessary time depending upon the temperature and the amount of catalyst used, as these are all interdependent. Test procedures can be carried out to determine the optimum conditions in the equipment being used for the reactor.

Since water is also reactive in the polymerization reaction, all of the ingredients are kept as dry as possible, and are kept from contact with the atmosphere. It is also useful to have a dry gas purge of the reactor during the treatment step to remove from the reactor the water that is formed as the hydroxyl endblocked impurities are condensed.

After the hydroxyl endblocked low molecular weight polydiorganosiloxane is condensed to a high molecular weight, the mixture is cooled to room temperature and the catalyst salt is filtered from the mixture of cyclic material and high molecular weight linear material. The mixture is maintained under anhydrous conditions at all times.

This mixture can then be polymerized in the normal, well known manner of converting diorganotetracyclosiloxane the high molecular weight linear polymers, using a polymerization catalyst and elevated temperature to cause the polymerization. After polymerization, the catalyst is neutralized, the mixture cooled and the high molecular polymer is ready for use. The polymer will have a greatly reduced activity due to the low amount of hydroxyl radical that is present, due to the use of the procedure discussed above. A preferred catalyst for polymerization is potassium silanolate. Neutralization is commonly done with carbon dioxide or acetic acid.

An even purer diorganocyclopolysiloxane can be produced by separating the high molecular weight liner polymer from the polydiorganocyclosiloxane before the polymerization of the polydiorganocyclosiloxane. This is easily done by heating the mixture and driving the polydiorganocyclosiloxane overhead while leaving the high molecular weight linear material containing the hydroxyl endblocking behind in the still because of its much higher boiling point. By carrying overhead about 98 percent of the mixture and leaving the rest in the pot, a polydiorganocyclosiloxane having less the 0.1 percent by weight of non-volatile material and a hydroxyl content of less than one part per million of material can be produced.

When this purer polydiorganocyclosiloxane is polymerized, a polymer having a non-volatile content of greater than 98.0 percent by weight and an activity of less than 40 can be achieved.

The polydiorganosiloxane produced by the method of this invention is particularly useful in the production of silicone elastomer stocks which are reinforced with colloidal silica.

The following examples are included for illustrative purposes only and should not be construed as limiting the invention which is properly set forth in the appended claims. All parts are parts by weight.

EXAMPLE 1

A reaction vessel capable of heating and distilling was loaded with 1000 grams of crude polydimethylcyclosiloxane, 1.36 grams of dimethylvinylsiloxy endblocked polydimethylsiloxane having about 5 dimethylsiloxane units per molecule, 1.65 grams of polymethylvinylcyclosiloxane, and 10 grams of potassium carbonate. The mixture was heated for 2 hours at 130° C. with a dry nitrogen purge. Then 100 grams of molecular sieves were added and the mixture allowed to stand for ½ hour. The liquid and solids were separated and the liquid returned to the reactor. The reactor was then purged with a continuous stream of dry nitrogen at a reactor temperature of 110° C. for ½ hour. Then sufficient potassium silanolate was added to give 10 parts per million potassium and the mixture was heated for 3 hours at 165° C. to polymerize the polydimethylcyclosiloxane. The polymerized material was then cooled, removed from the reactor and placed on a two roll mill and mixed with acetic acid to neutralize the catalyst. The polymer was them tested for properties with the results shown in Table I.

The above experiment was then repeated with the exception of the first procedure of heating the mixture in the presence of potassium carbonate. The results of this comparative example are found in Table I.

The plasticity is a measure of the resistance of the material to flow, the test being based upon ASTM D926. An amount of polymer equal to four times the specific gravity in grams is weighed and shaped into a ball, then allowed to sit for 1 hour before testing. The sample is then placed between the platens of the plastometer and the upper platen is released onto the sample. At 3 minutes time, the thickness of the sample is read and recorded. This value in thousandths of an inch is recorded as the plasticity. The higher the number, the stiffer the material.

Branching is an analytical test designed to give a relative measure of the number of silicon atoms in the molecule having a polymer side chain attached. A 9.53 g sample of the polymer is dissolved in 100 ml of toluene and 2 gm of an acid ion exchange resin is mixed in to remove any residual catalyst. After removal of the ion exchange resin, the viscosity of the 10 percent solution is measured. The relationship between the plasticity measurement of polymer molecular weight and the solution viscosity measurement of polymer molecular weight are then compared with standardized charts which have been previously prepared by calibrating with a series of polymers that were deliberately prepared with varying degrees of branching in the molecules. The number taken from the chart is a relative measure of branching, the higher the number, the more branches that are present.

Weight loss is a measure of the amount of volatile material in the polymer. A 10 g sample is placed in an aluminum foil dish, carefully weighed and then placed in a air circulating oven for 3 hours at 150° C., removed, cooled, and reweighed. The percent weight loss is then calculated.

The amount of hydroxyl endblocking left in the polymer is judged by an activity test in which a sample of the polymer is dissolved in toluene. then mixed with ethylorthosilicate crosslinker and dibutyltindiacetate catalyst. This mixture is placed in a viscosity tube at a temperature of 25° C. and the viscosity measured at 10 minutes after catalyzation and at 20 minutes after catalyzation. The viscosity at the two times is the plotted on a chart and the slope of the line is determined. The procedure is repeated and the average of the two slopes is reported as the activity of the polymer. The higher the activity number, the more hydroxyl radical is present in the polymer to be reacted with the crosslinker.

TABLE I

|  | Invention | Comparative Example |
|---|---|---|
| Plasticity | 86 | 55 |
| Branching | 26 | 25 |
| Weight Loss, 3/150° C. | 9.7 | 9.2 |
| Activity | 50 | 81 |
| Molecular Weight | 458,000 | 384,000 |

EXAMPLE 2

A series of runs were made following the procedure of Example 1 with the exceptions noted in Table II. In runs 3,4, 7, and 8, the endblocker used was a low viscosity trimethylsiloxy endblocked polydimethylsiloxane. The amounts were adjusted to give the same amount of endblocking in both cases. Runs 1,4,5, and 8 do not contain the polymethylvinylcyclosiloxane to make a copolymer as was done in Example 1. The first 4 runs are comparative example, while the last 4 runs are examples of this invention. Because this invention removes the —SiOH endblocking, in the last 4 runs, the amount of endblocker is increased so that the polymers all have the same range of molecular weight.

The polymer properties were measured with the results shown in Table II. Those runs made in accordance with this invention have a much lower activity when compared to the comparable runs made in the comparative examples.

TABLE II

|  | Comparative Examples | | | |
|---|---|---|---|---|
| Run | 1 | 2 | 3 | 4 |
| polydimethylcyclosiloxane, g | 1000 | 998.4 | 998.4 | 1000 |

TABLE II-continued

| | | | | |
|---|---|---|---|---|
| polymethylvinylcyclosiloxane, g | 0 | 1.65 | 1.65 | 0 |
| dimethylvinyl endblocker, g | 0 | 0 | 1.35 | 1.35 |
| trimethyl endblocker, g | 3.33 | 3.33 | 0 | 0 |
| potassium carbonate, g | 0 | 0 | 0 | 0 |
| treatment, hours/°C. | 0/0 | 0/0 | 0/0 | 0/0 |
| Loaded reactor purge, hours/°C. | 2.5/130 | 2.5/130 | 2.5/130 | 2.5/130 |
| plasticity | 69 | 73 | 56 | 59 |
| branching | 17 | 22 | 13 | 6 |
| weight loss, 3/150° C. | 8.2 | 8.5 | 9.3 | 9.4 |
| activity | 109 | 112 | 100 | 91 |
| molecular weight | 295000 | 307000 | 260000 | 254500 |

| | Examples | | | |
|---|---|---|---|---|
| Run | 5 | 6 | 7 | 8 |
| polydimethylcyclosiloxane, g | 1000 | 998.4 | 998.4 | 1000 |
| polymethylvinylcyclosiloxane, g | 0 | 1.65 | 1.65 | 0 |
| dimethylvinyl endblocker, g | 0 | 0 | 1.85 | 1.85 |
| trimethyl endblocker, g | 8.0 | 8.0 | 0 | 0 |
| potassium carbonate, g | 10 | 10 | 10 | 10 |
| treatment, hours/°C. | 2/130 | 2/130 | 2/130 | 2/130 |
| Loaded reactor purge, hours/°C. | 0.5/130 | 0.5/130 | 0.5/130 | 0.5/130 |
| plasticity | 52 | 53 | 62 | 59 |
| branching | 15 | 13 | 12 | 9 |
| weight loss, 3/150° C. | 9.4 | 9.2 | 9.6 | 9.8 |
| activity | 34 | 33 | 39 | 34 |
| molecular weight | 205300 | 228000 | 252400 | 261300 |

EXAMPLE 3

Cesium carbonate was evaluated in the above described process as the material used to treat the polydimethylcyclosiloxane.

A preparation was prepared similar to run 5 of Example 2, above, except that 7 g of the trimethyl endblocker was used, the treatment agent was 25 g of cesium carbonate, the treatment time was 2 hours at 80° C. and 1 hour at 130° C., and the polymerization was for 3 hours at 175° C. The resultant polymer was then evaluated as above with the results shown in Table III.

TABLE III

| | |
|---|---|
| plasticity | 60 |
| branching | 19 |
| weight loss, 3/150° C. | 9.34 |
| activity | 27 |

EXAMPLE 4

An experiment was performed in which 100 parts by weight of the polydimethylcyclosiloxane was mixed with 1 part by weight of potassium carbonate and treated for 2 hours at 130° C. A similar experiment was performed in which no potassium carbonate was present. The resulting fluids were then analyzed in a gas chromatography unit for composition, with the results shown in Table IV. The treatment removed the linear contaminants from the polydimethylcyclosiloxane.

TABLE IV

| | | percent present | |
|---|---|---|---|
| | | Control | Treated |
| polydimethylcyclosiloxane, | D3 | 0.2 | 0.2 |
| | D4 | 0.02 | 0.0 |
| | D5 | 88.3 | 98.1 |
| | D6 | 0.6 | 0.7 |
| | D7 | 0.13 | 0.3 |
| polydimethylsiloxane, | L4 | 0.03 | 0.0 |
| | L5 | 0.04 | 0.0 |
| | L6 | 0.02 | 0.0 |

TABLE IV-continued

| | percent present | |
|---|---|---|
| | Control | Treated |
| L7 | 0.91 | 0.0 |
| L8 | 0.81 | 0.0 |
| L9 | 0.77 | 0.0 |
| L10 | 1.52 | 0.0 |
| L11 | 2.35 | 0.0 |
| L12 | 2.48 | 0.0 |
| L13 | 1.82 | 0.0 |

EXAMPLE 5

A series of compositions were prepared to compare the effect of varying the amount of endblocker used and to evaluate the effect of separating the treated cyclics from the condensed linear byproducts of the treatment procedure before the polymerization step.

In runs 9 through 12, the reaction vessel was loaded with 1000 g of the crude polydimethylcyclosiloxane, the grams of the trimethylsiloxy endblocked polydimethylsiloxane endblocker shown in Table V, and the amount of potassium carbonate treating agent shown in the table. The treatment was at 130° C. for the time shown in the table. The potassium carbonate was then filtered from the treated mixture. The treated polydimethylcyclosiloxane was then mixed with 100 g of molecular sieves.

In runs 13 and 14, the reaction vessel was loaded with 1000 g of the crude polydimethylcyclosiloxane and the amount of potassium carbonate treating agent shown in the Table V. The treatment was for 2 hours and 130° C. The potassium carbonate was then filtered from the treated mixture. The treated cyclics were then stripped overhead until about 80 percent by weight of the mixture had been distilled overhead. The residue in the distillation pot contained the linear polydimethylsiloxane that had been condensed by the treatment into molecules that would not distill overhead at the operating temperature. These distilled cyclic materials were then treated with the molecular sieves in the same manner as the previous runs.

After ½ hour exposure to the molecular sieves, the sieves were filtered out and the dried cyclics placed back in the reactor. A nitrogen purge of ½ hour and a temperature of from 130° C. to 170° C. then removed any moisture from the reactor and sufficient potassium silanolate was added to give 5 parts potassium per million parts of cyclics. Polymerization was carried out at a temperature of 170° C. for a period of 3 hours with a flow of nitrogen through the reactor to remove any moisture present. The catalyst was then neutralized with 8 parts per million of acetic acid.

The resulting polymers were then evaluated in the manner described in Example 1 with the results shown in Table V.

TABLE V

| Run | 9 | 10 | 11 | 12 | 13 | 14 |
|---|---|---|---|---|---|---|
| Endblocker, g | 6.5 | 7.5 | 8.0 | 10 | 7.5 | 10 |
| Potassium carbonate, g | 0 | 10 | 10 | 10 | 10 | 10 |
| treatment time, hrs | 0 | 3 | 2 | 2 | 2 | 2 |
| Overhead, percent | 0 | 0 | 0 | 0 | 70 | 83 |
| plasticity | 53 | 58 | 49 | 40 | 57 | 38 |
| branching | nil | nil | nil | 13.5 | nil | 15.2 |
| weight loss, 3/150° C. | 8.9 | 8.8 | 10.2 | 7.2 | 8.6 | 10.8 |
| activity | 44 | 27 | 27 | 28 | 13 | 10 |

EXAMPLE 7

This is a comparative example.

Experiments were run to see if lithium carbonate and sodium carbonate were effective in lowering activity.

In an experiment similar to that of Example 1, polydimethylcyclosiloxane was treated with lithium carbonate at a cation molar concentration equivalent to 1 percent by weight of potassium carbonate (the level used in Example 1). Treatment was at a temperature of 110° C. The treated cyclics were then measured for non-volatile content and linear polymer content, then polymerized using 20 parts per million of potassium silanolate catalyst, using the same amount of endblocker as in Example 1. The polymer produced was then evaluated for properties, with the results shown in Table VI.

Duplicate experiments were run using sodium carbonate as treating agent, and using no treating agent. The results are shown in Table VI.

TABLE VI

| Treating Agent | Plasticity | Activity | NVC ppm | Linears ppm |
|---|---|---|---|---|
| None | 54 | 35 | 460 | 75 |
| lithium carbonate | 56 | 30 | 460 | 89 |
| sodium carbonate | 51 | 34 | 5000 | 23 |

NVC is non volatile content measured by heating for 3 hours at 150° C. shown in parts per million by weight. Linears is a measure by gas chromatography of the amount of small chain linear polymer present having a degree of polymerization up to 8.

There is no significant change in activity or plasticity from the treatment with these treating agents. The large increase in non-volatile content using the lithium carbonate indicates that there was ring opening occurring as well as condensation to cause formation of high polymers in the cyclics.

That which is claimed is:

1. A method of reducing the activity of a polydiorganosiloxane consisting essentially of
   (A) mixing crude polydiorganocyclosiloxane with from 0.5 to 10 percent by weight of a carbonate or bicarbonate salt of potassium or cesium,
   (B) heating the mixture to a temperature of from 70° C. to 150° C. for a period of from 1 to 5 hours, with a dry gas purge to carry off volatile materials,
   (C) cooling to room temperature and filtering to remove the salt,
   to yield polydiorganocyclosiloxane having a reduced activity.

2. A method of reducing the activity of a polydiorganocyclosiloxane consisting essentially of
   (A) stripping the product obtained from the method of claim 1 at a temperature and pressure sufficient to carry overhead approximately 98 percent by weight of the starting material,
   to yield polydiorganocyclosiloxane having a non-volatile content of less than 0.1 percent by weight and a hydroxyl content of less than 1 part per million of polydiorganocyclosiloxane.

3. A method of producing a polydiorganosiloxane having a reduced activity consisting essentially of
   (A) mixing together the product produced by the method of claim 2, a triorganosiloxy endblocker, and a polymerization catalyst,
   (B) heating the mixture to a temperature and for a time sufficient to polymerize the polydiorganocyclosiloxane to the desired degree,
   (C) neutralizing the polymerization catalyst, and
   (D) devolatilizing the polydiorganosiloxane,
   to yield a polydiorganosiloxane having a non-volatile content of greater than 98.0 percent by weight and an activity of less than 40.

4. The method of claim 1 in which the carbonate salt is potassium carbonate.

5. The method of claim 3 in which the polymerization catalyst is potassium silanolate.

6. The method of claim 3 in which the polymerization catalyst is neutralized with acetic acid.

7. The method of claim 3 in which the polymerization catalyst is neutralized with carbon dioxide.

* * * * *

UNITED STATES PATENT AND TRADEMARK OFFICE
CERTIFICATE OF CORRECTION

PATENT NO. : 4,704,443
DATED : November 3, 1987
INVENTOR(S) : Peter Lamont

It is certified that error appears in the above-identified patent and that said Letters Patent is hereby corrected as shown below:

Column 6,

Table V, run 12, weight loss 3/150°C, should read 8.2 instead of 7.2.

Signed and Sealed this

Thirty-first Day of May, 1988

Attest:

DONALD J. QUIGG

Attesting Officer

Commissioner of Patents and Trademarks